(12) United States Patent
Lin

(10) Patent No.: US 6,516,709 B1
(45) Date of Patent: Feb. 11, 2003

(54) APPARATUS FOR STEAMING FOOD

(75) Inventor: Yu Yuan Lin, Tainan (TW)

(73) Assignee: Uni-Splendor Corporation (CN)

( * ) Notice: Subject to any disclaimer, the term of this patent is extended or adjusted under 35 U.S.C. 154(b) by 0 days.

(21) Appl. No.: 09/992,894

(22) Filed: Nov. 5, 2001

(51) Int. Cl.[7] .............................. A23L 1/00; A47J 24/00; A47J 27/04; A21B 1/00; A21B 1/08
(52) U.S. Cl. .............................. 99/331; 99/337; 99/403; 99/417; 99/450; 99/476; 99/483; 126/369; 219/401
(58) Field of Search ............................. 99/325–333, 337, 99/338, 403–417, 444–450, 468, 476, 483, 339, 473, 340; 126/369, 369.1, 369.2, 20, 20.1, 20.2; 219/400, 401; 426/510, 511, 523

(56) References Cited

U.S. PATENT DOCUMENTS

| | | | | |
|---|---|---|---|---|
| 3,908,111 A | * | 9/1975 | Du Bois et al. | 219/442 |
| 4,148,250 A | * | 4/1979 | Miki et al. | 99/403 |
| 4,426,923 A | * | 1/1984 | Ohata | 99/468 |
| 4,655,192 A | * | 4/1987 | Jovanovic | 126/20 |
| 4,672,179 A | * | 6/1987 | Onishi et al. | 99/403 X |
| 4,739,698 A | * | 4/1988 | Allaire | 99/410 |
| 4,982,656 A | * | 1/1991 | Stone | 99/450 X |
| 5,092,229 A | * | 3/1992 | Chen | 99/413 X |
| 5,189,947 A | * | 3/1993 | Yim | 99/415 |
| 5,400,701 A | * | 3/1995 | Sham | 99/410 |
| 5,595,109 A | * | 1/1997 | Shelton | 99/476 |
| 5,893,319 A | * | 4/1999 | Bois | 99/410 |
| 6,267,046 B1 | * | 7/2001 | Wanat | 99/332 |

\* cited by examiner

Primary Examiner—Timothy F. Simone
(74) Attorney, Agent, or Firm—Dilworth & Barrese, LLP

(57) ABSTRACT

There is provided an apparatus for steaming food, which includes a steam cooking plate, an upper heater, two upper steam pipes, an instantaneous steam generator including an inner sealed space, a lower heater, a pump and a water tank. The steam generator consists of a generator upper cover, a gasket, and a generator lower cover. The pump sucks water from the water tank and the water is supplied to the steam generator. The vapor steamed in the steam generator moves to the steam plate to cook food on the surface of the steam cooking plate. The upper heater directly heats the steam cooking plate to cook food thereon.

14 Claims, 6 Drawing Sheets

APPARATUS FOR STEAMING FOOD

BACKGROUND OF THE INVENTION

1. Field of the Invention

The present invention relates to an apparatus for cooking food. More particularly, the present invention relates to a food steamer to cook foodstuffs, such as fish, meats, and vegetables.

2. Description of the Prior Art

Devices that are used to cook food with steam are well known in the art. More specifically, the cooking devices heretofore devised and utilized for the purpose of cooking food are known to consist basically of familiar, expected and obvious structural configurations, notwithstanding the myriad of designs encompassed in the crowded art which have been developed for the fulfillment of countless objectives and requirements.

For example, U.S. Pat. No. 4,655,192 to Jovanovic is directed to a steam cooker that has a heater for creating steam and a convection heater for maintaining the ambient temperature in the cooking chamber. The convection heater is independent of the steam generating heater associated with boiling water for steam.

U.S. Pat. No. 5,595,109 to Shelton is directed to a food dehumidifier. The dehumidifier has two fans. One fan circulates air and the other fan blows ambient air into a water reservoir to reduce the temperature thereof.

U.S. Pat. No. 5,893,319 to Bois is directed to an appliance for heating foodstuffs with steam. The appliance has a housing having a bottom and a sidewall, and has a cold water reservoir and a cooking chamber. The housing has a channel communicating with the exterior of the housing through a filling cover and with the interior of the housing through a flow opening emptying into the cold water reservoir.

U.S. Pat. No. 6,267,046 to Wanat is directed to a convection steamer. The apparatus includes a convector that urges steam upward. The apparatus also comprises a receiving portion for receiving a water reservoir, a timer, and a tilt top housing.

Even though these devices may be suitable for the specific individual purposes to which they address, they differ from the present invention in that the present invention provides several unique features and advantages as hereinafter contrasted.

SUMMARY OF THE INVENTION

An object of the present invention is to provide a novel type of an apparatus for steaming food, especially a simple, convenient and rapid cooking apparatus.

In accordance with the present disclosure, an apparatus having a steam plate, an upper heater for heating the steam cooking plate, at least one upper steam pipe, an instantaneous steam generator, a lower heater associated with the steam generator, a lower water pipe, a pump and a water tank is provided.

The upper heater is installed under the steam cooking plate. The steam cooking plate heated by the upper heater defines a food steaming chamber along with a removable domed cover. The steam cooking plate includes a cooking surface for supporting food placed there on and at least one steam inlet port. The food-supporting surface may be flat or include a plurality of ridges or ribs. The foodstuffs being cooked are surrounded by the hot vapor and are well steamed.

The instantaneous steam generator is heated by the lower heater and is an effective means to quickly boil water and create steamed vapor. The steam generator includes an upper cover and a lower cover which are combined to create an inner sealed space, and includes a raceway-like track to hold the water between the two covers and create a highly pressurized heated chamber. The inner track surface of the steam generator increases the surface to contact water in order to heat the water quickly and easily.

The water in the water tank is transferred to the steam generator by operation of the pump through the lower water pipe, and the water in the inner sealed space of the steam generator is steamed by operation of the lower heater. The steam of the boiled water moves from the steam generator through at least one upper steam pipe and into the chamber formed by the steam cooking plate and the removable cover. The temperature in the chamber is maintained by the upper heater both during and after steaming.

BRIEF DESCRIPTION OF THE DRAWINGS

The above objects and other advantages of the present invention will become more apparent from the following detailed description taken in conjunction with the accompanying drawings, in which.

DETAILED DESCRIPTION OF THE INVENTION

Figure 1:
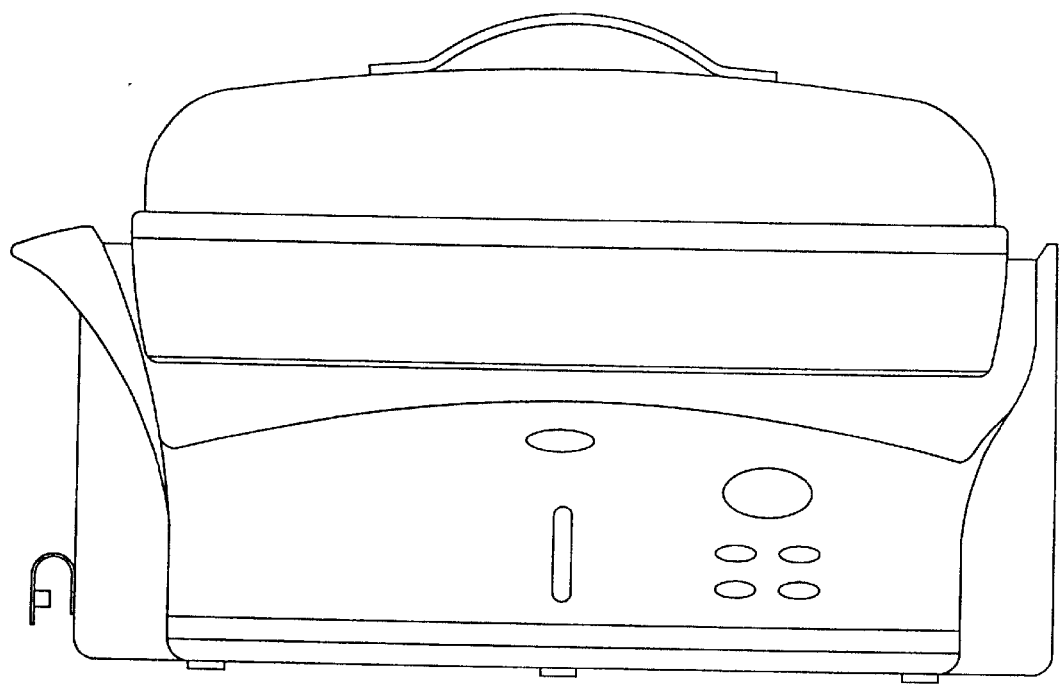
FIG. 1 is a front elevation view of the food steamer of the present invention.
Figure 2:
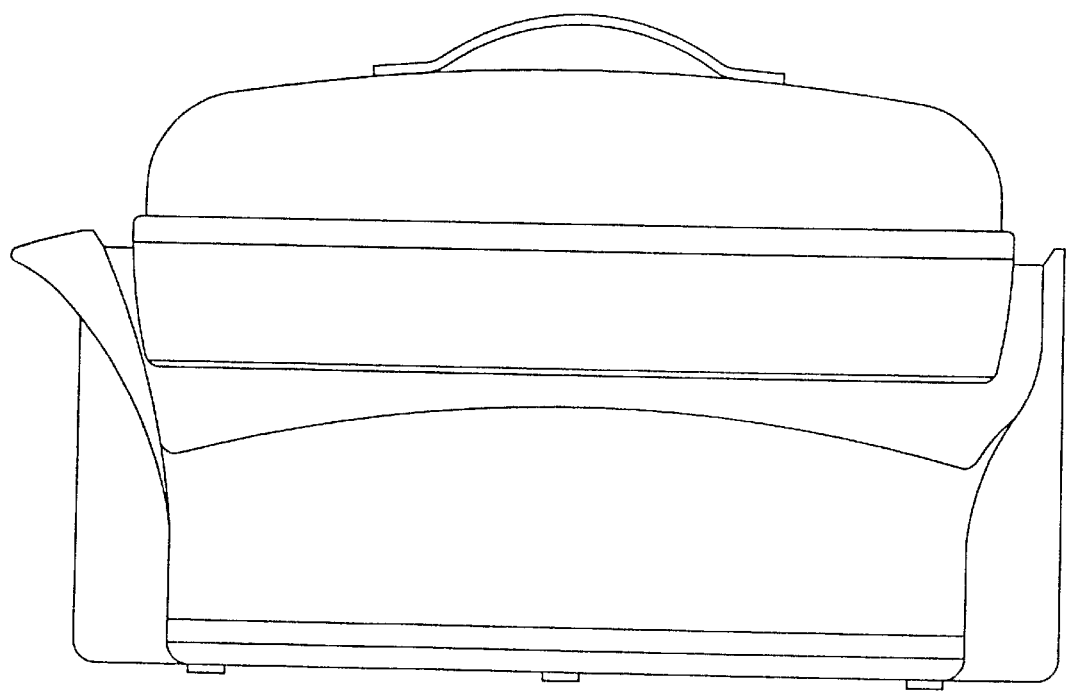
FIG. 2 is a rear elevation view of the food steamer as seen in FIG. 1.
Figure 3:
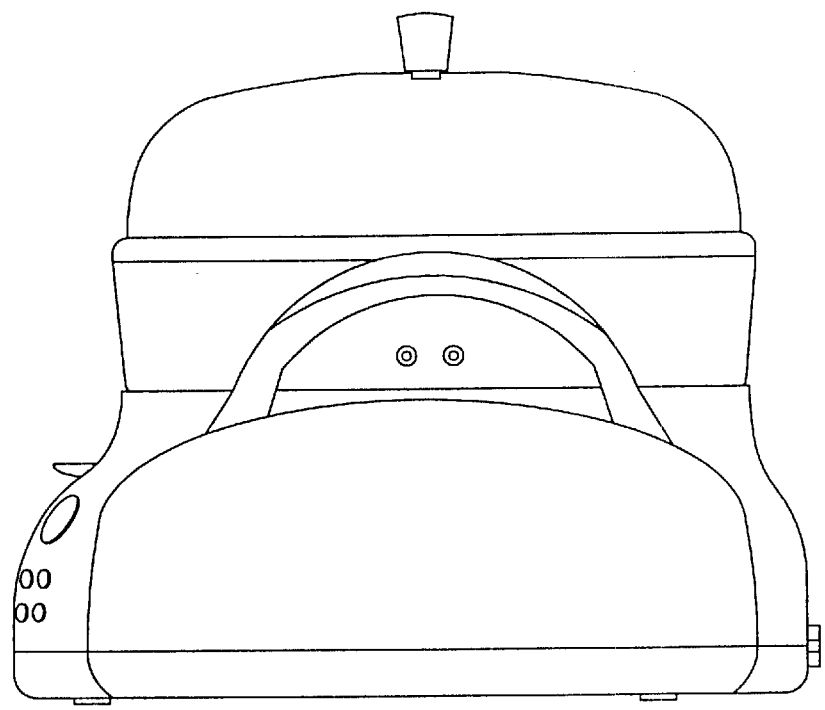
FIG. 3 is a side elevation view of the food steamer as seen in FIG. 1.

A preferred embodiment of the present invention will be described herein below with reference to the accompanying drawings. In the following description, like reference numerals identify similar or identical elements throughout the several views, while well known functions or constructions are not described in detail so as not to obscure the invention in unnecessary detail.

Figure 4:
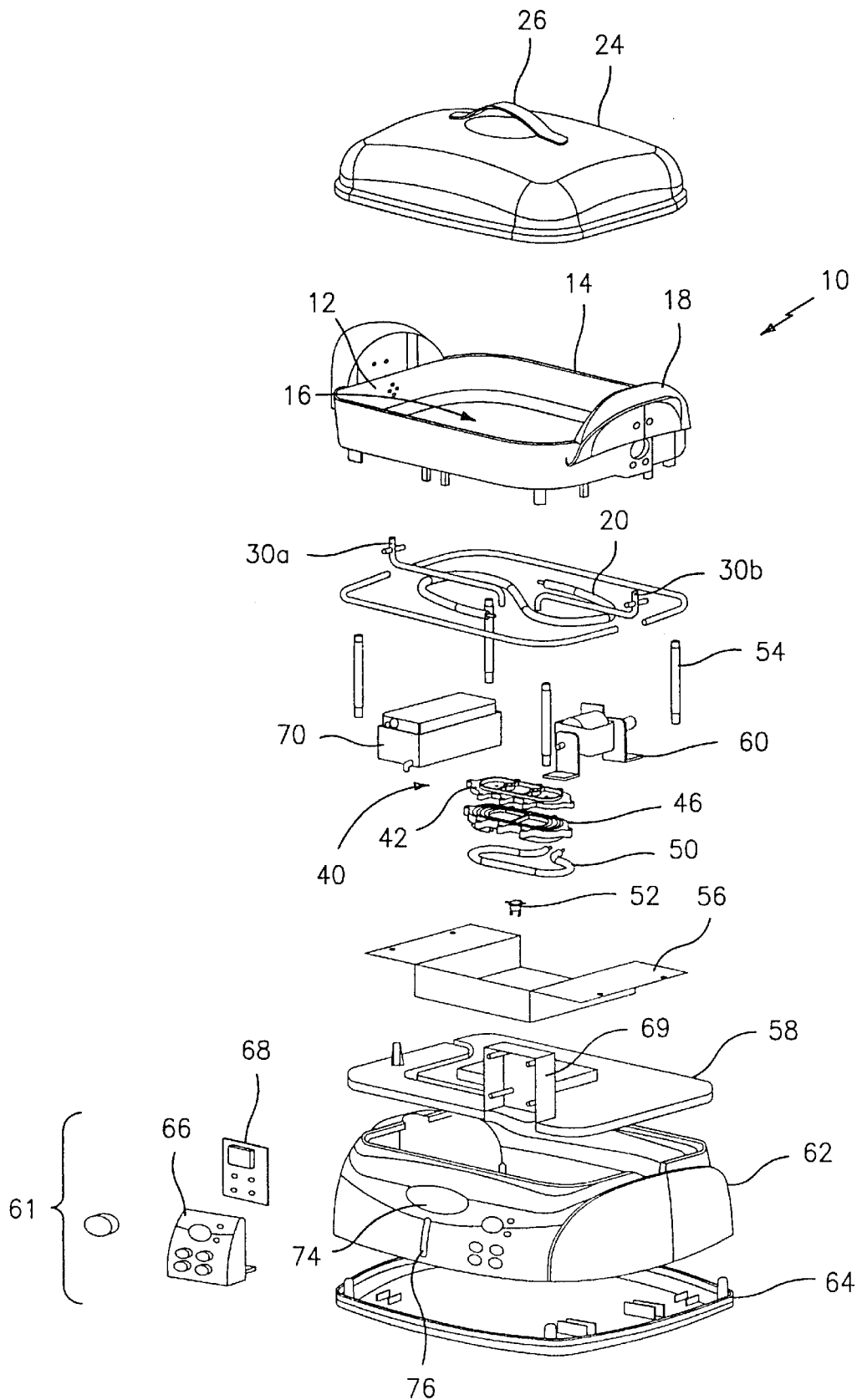
FIG. 4 is an exploded perspective view of the food steamer of the present invention.

Referring to FIG.4, the apparatus for steaming food comprises a steam cooking plate 10, an upper heater 20, at least one upper steam pipe 30, an instantaneous steam generator 40, a lower heater 50, a lower water pipe 80, a pump 60, and a water tank 70. Preferably, two upper steam pipes 30A and 30B are provided. The apparatus also includes a heat shield 56, a lower housing 62, 64 and a lower base 58 for supporting the internal components situated beneath the steam cooking plate 10. A removable cover 24 is also provided, which together with the steam cooking plate 10, forms a steaming chamber for food.

Figure 5:
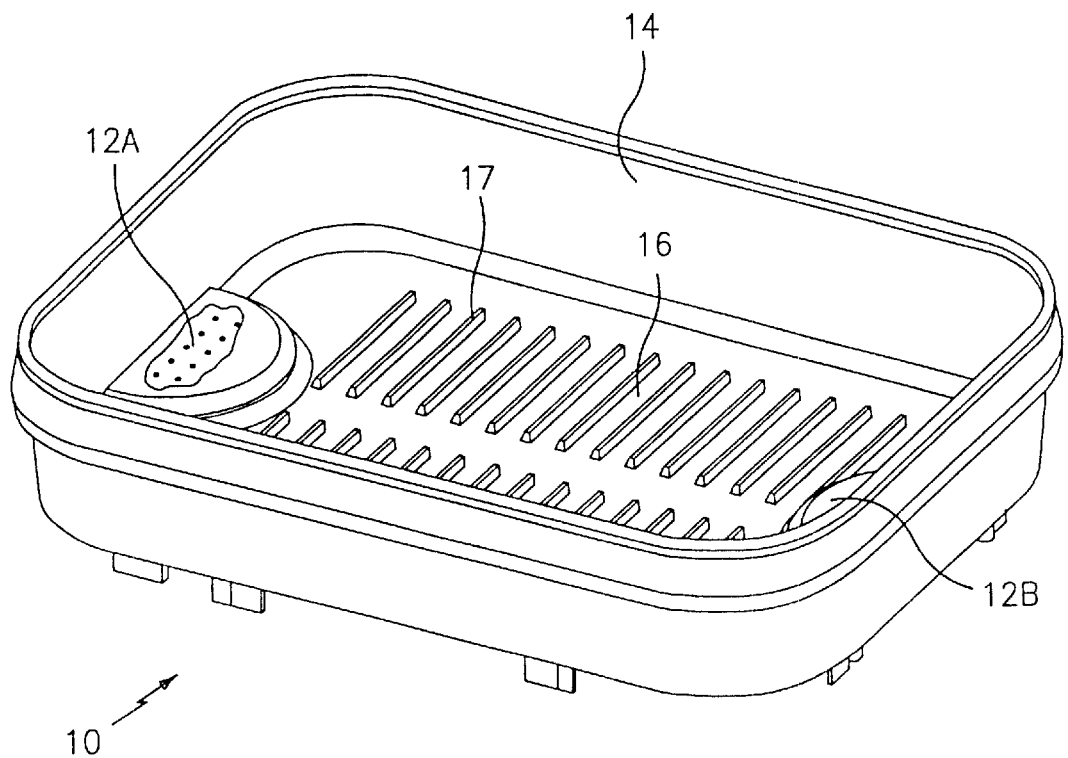
FIG. 5 is a perspective view of an alternative embodiment of the steam cooking plate.

The steam cooking plate 10 is a container for cooking foodstuffs, for example, vegetables, meats, or fish, and preferably comprises a flat, non-stick cooking surface for supporting food. The steam cooking plate 10 has a cooking surface 16, a container wall 14 and at least one but preferably two steam inlet ports 12, each of which has perforations where hot steam may enter. The hot vapor steams foodstuffs to cook them. Alternatively, as seen in FIG. 5, the surface of the cooking portion 16 includes raised ribs 17 to provide a space between the foodstuffs and the cooking surface 16. The foodstuffs are surrounded by the hot vapor and well steamed. In addition, the spacing reduces the possibility of the foodstuffs on the surface from being burned or being adhered to the surface of the steam cooking plate 10. The food supporting portion of the cooking surface 16 can be of different configurations such as a flat plate or other types. The steam inlet ports 12 can be installed on the side walls as seen in FIG. 4, or on the lower cooking surface 16 of the steam cooking plate 10 as seen in FIG. 5. The number of inlet ports 12 are determined by the number of steam pipes 30, which is preferably two, that are directed to opposite ends of the steam cooking plate 10. The steam cooking plate 10 is provided with handles 18 to facilitate handling the apparatus at the edge thereof. The handles 18 can be made of a non-heat conducting material so that users can handle the food steamer safely. The shape of handles 18 can vary. A cover 24 is provided for the steam cooking plate 10 and has a knob 26 to facilitate removal of the cover 24 from the steam cooking plate 10. The removable cover 24 may have a transparent portion to permit viewing of the food as it cooks.

The heat shield 56 is preferably positioned under the instantaneous steam generator 40 and absorbs heat and cools the system to prevent overheating.

The internal components are located on lower base 58, including the pump 60, the water tank 70, and control assembly 61, which includes switch 66, PCB 68, and control housing 69. Holders 54 for supporting the steam cooking plate 10 are also located on the lower base 58.

The lower housing consists of a bottom cover 64 and a body wall 62. The four holders 54 and the body wall 62 create a space for installation of the upper heater 20, the two upper steam pipes 30, the instantaneous steam generator 40, the lower heater 50, the lower water pipe 80, the heat shield 56, the pump 60, and the water tank 70.

Switch 66 and PCB 68 turns on and off the apparatus and is installed on the housing wall 62. Preferably, a security switch is also provided on the apparatus for preventing oversteaming and to stop the steaming function when the removable cover 24 is opened for the users' safety. The PCB 68 preferably includes a micro-controller, which controls the operation of the apparatus. When the steam function is turned off by under the control of the PCB 68, the upper heater 20 may continue to be controlled by the PCB for grilling food, frying food, etc.

A water inlet 74 and water indicator 76 are also configured on the housing wall 62. Water is supplied from the water inlet 74 through a tube into the water tank 70. The water indicator 76 on the housing wall 62 indicates the level of the water remaining in the water tank 70.

Figure 6:
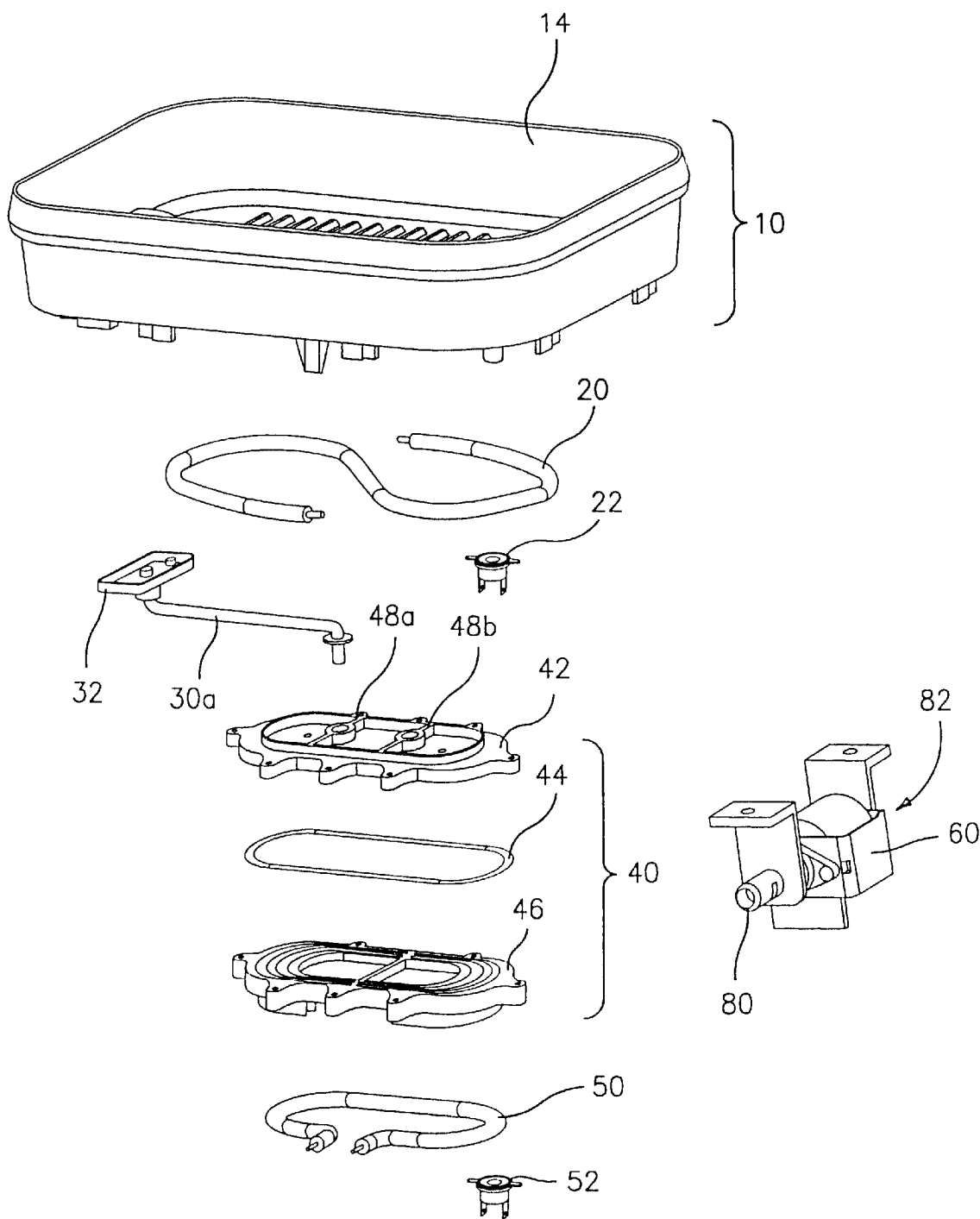
FIG. 6 is an exploded perspective view of the assembly of the heating system of the food steamer including the steam cooking plate, the upper heater, the instantaneous steam generator, the lower heater and the pump.
Figure 7:
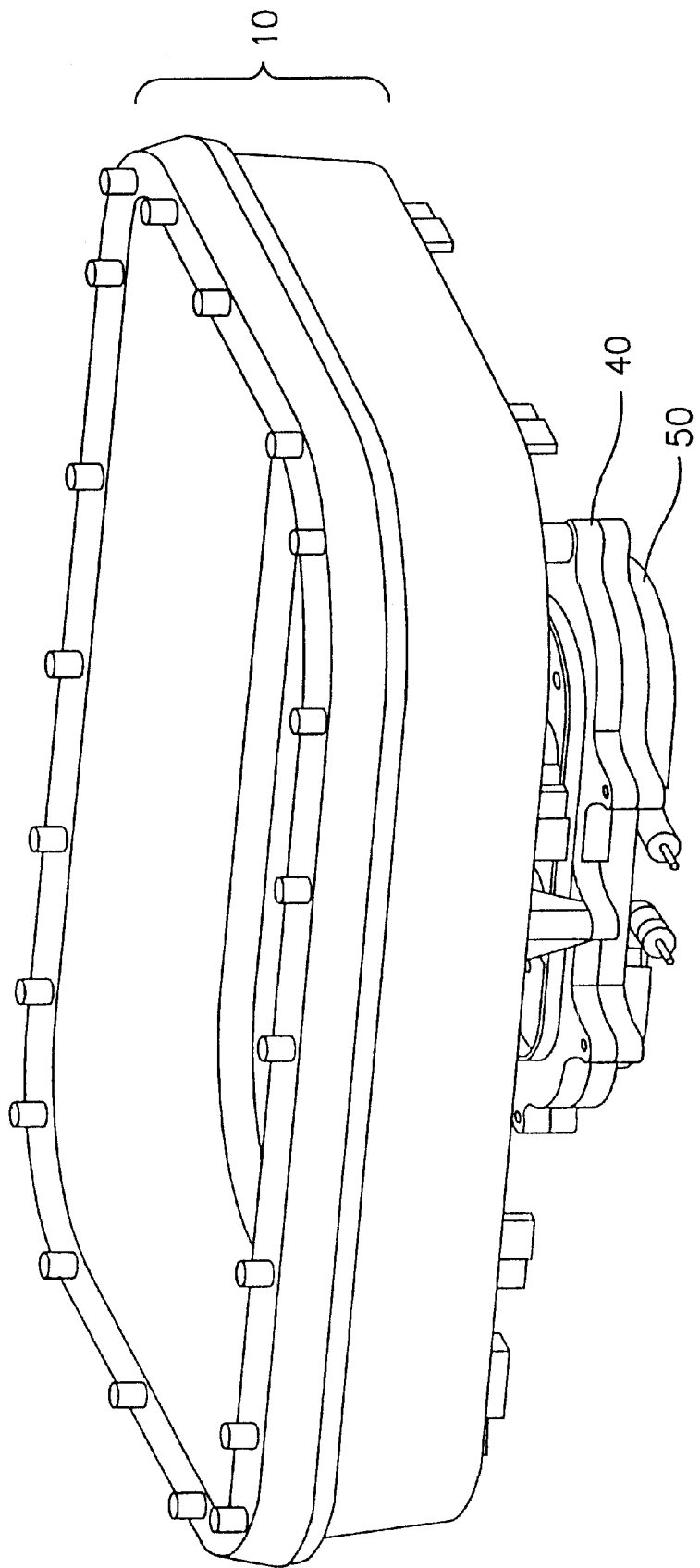
FIG. 7 is a perspective view of the assembled heating system of FIG. 6.
Figure 8:
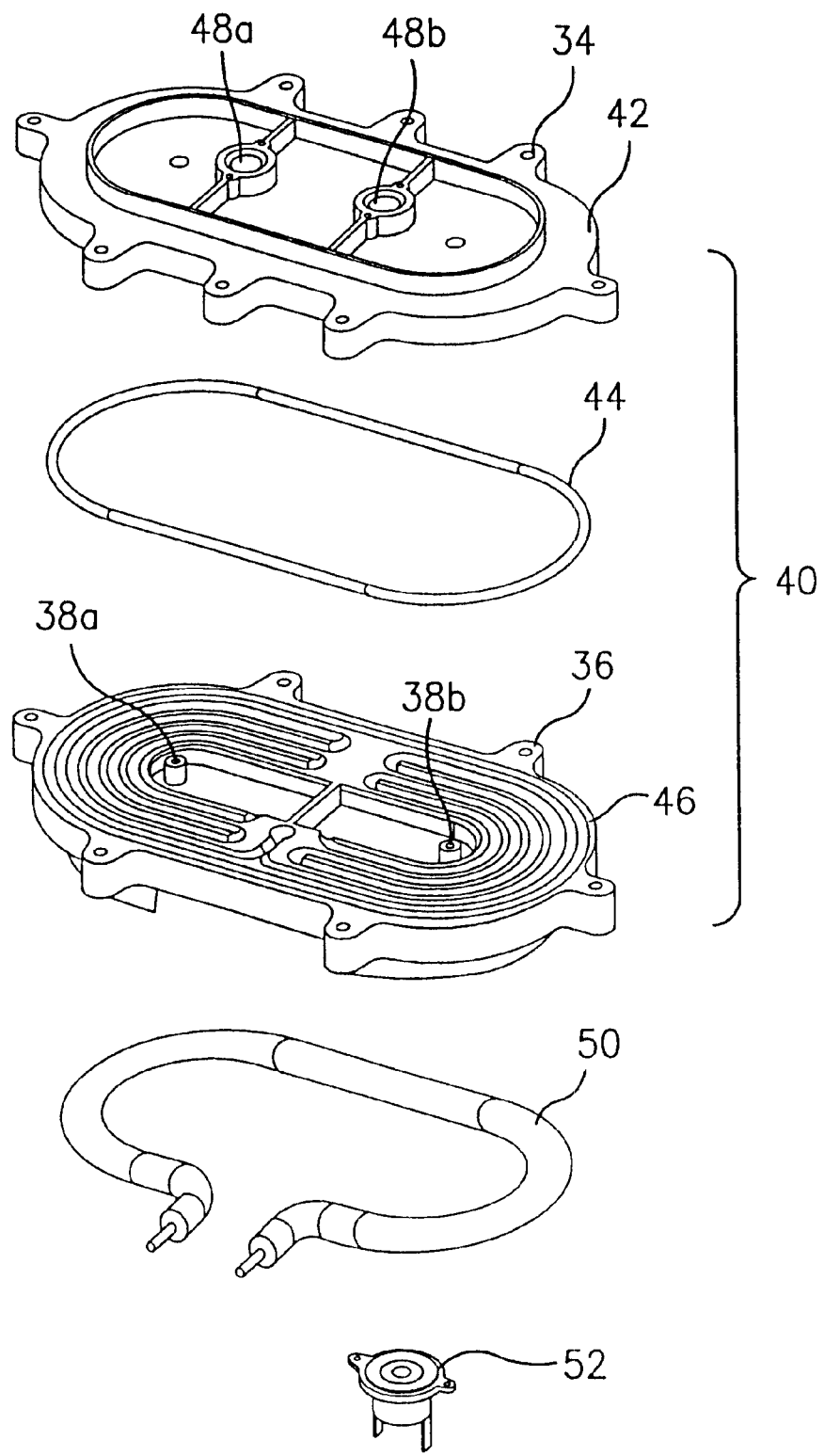
FIG. 8 is an exploded perspective view of the instantaneous steam generator and the lower heater.

Turning now to FIGS. 6, 7 and 8, the upper heater 20, which preferably has an "S" shape, is installed under the steam cooking plate 10. The upper heater 20 is used to maintain the steam cooking plate 10 at a temperature that keeps the steam cooking plate 10 warm and prevents condensation of steam thereupon. The upper heater 20 is also used to heat the steam cooking plate 10 for cooking the foodstuffs in the steam cooking plate 10 without steam vapor from the instantaneous steam generator 40. A thermostat may be provided to regulate the temperature of the upper heater 20.

The instantaneous steam generator 40 is a means to boil water and make steamed vapor. The generator 40 consists of an upper cover 42, a gasket 44, and a lower cover 46. The upper cover 42 preferably has two output openings 48 and the lower cover 46 may have two input openings 38 (FIG. 8), but preferably has a single centrally located opening. The two output openings 48 are where the vapor steamed in the steam generator 40 exits. The upper cover 42 and the lower cover 46 are combined and make a inner sealed space to hold the water between the two covers so that the water is highly pressurized and heated by the lower heater 50. The gasket 44 seals the gap between the two covers and protects the generator 40 from losing pressure and heat for the water. The generator covers are preferably made of heat conducting metal. The inner surfaces of the generator covers have a raceway-like track, which increases the surface for contact of water in order to heat the water quickly and easily. The shapes of the inner surfaces of the two covers are symmetrical to match on edge. Thermostat 52 regulates the temperature of the lower heater 50. Preferably, there are provided two thermostats. The upper thermostat 22 is attached near the steam cooking plate 10 or the upper heater 20. On the other hand, the lower thermostat 52 is attached near to the steam generator 40 or the lower heater 50. The thermostats detect the temperature and maintain the desired temperature of the steam cooking plate 10 or the instantaneous steam generator 40, respectively. The temperatures may be pre-set or determined by adjustable thermostats.

As stated above, there are preferably two upper steam pipes 30. While the left upper steam pipe 30A is connected between the left outlet opening 48A of the generator upper cover 42 and the left steam inlet port of the steam plate 12A, the right upper steam pipe 30B is connected between the right outlet opening 48B of the generator upper cover 42 and the right steam inlet port 12B of the steam cooking plate 10 (See FIGS. 4 and 5).

Referring to FIG. 6, a lower water inlet pipe 80 is connected with the water tank 70. On the other hand, a water pipe outlet 82 is connected with the generator lower cover 46 to introduce water to the steam generator 40. Pipe outlet 82 may be connected to a dual tube to connect to dual water input opening 38A and 38B as shown in FIG. 8.

The pump 60 includes a motor and pumps water from the water tank 70. The water is supplied into the instantaneous steam generator 40 through the pipe outlet 82 by operation of the pump 60. The water in the tank is sucked by into the pump 60 through inlet 80 and then into the inner space of the steam generator 40 through the pipe outlet 82 and the inlet openings 38 of the generator lower cover 46. The water in the inner space of the instantaneous steam generator 40 is steamed by operation of the lower heater 50. The steam of boiled water and air moves from the inner space of the steam generator 40 into the steam cooking plate 10 through the upper steam pipes 30 and the perforations of the inlet opening portion 12 in the steam cooking plate 10 (See FIG. 4). The steamed vapor passes through the upper pipes 30 into the chamber above the steam cooking plate 10 because of high temperature and high pressure in the steam generator 40. The steamed vapor in the steam plate 10 cooks foodstuffs with high temperature and pressure in a short time in the chamber formed by the steam cooking plate 10 and the cover 24.

With respect to the above description, it is to be realized that the optimum dimensional relationships for the parts of the invention may include variations in size, materials, shape, form, function and the manner of operation, assembly and use, and would be deemed readily apparent to one skilled in the art. All equivalent relationships to those illustrated in the drawings and described in the specification are intended to be encompassed accompanying claims.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are believed to fall within the scope and spirit of the appended claims.

What is claimed is:

1. An apparatus for steaming food comprising;
    a steam cooking plate defining at least one steam inlet port and a cooking surface;
    a removable lid for covering the steam cooking plate to form a steaming chamber;
    an upper heater installed under the steam cooking plate for directly heating the steam cooking plate;
    a steam generator having a lower heater, at least one steam outlet opening and a water inlet opening;
    at least one upper steam pipe, connected between the steam outlet opening of the steam generator and the at least one steam inlet port of the steam cooking plate;
    a pump;
    a lower water pipe connected between the pump and the water inlet opening of the steam generator; and
    a water tank, for holding water and supplying the water to the pump for delivery to the water inlet opening of the steam generator.

2. The apparatus as recited in claim 1, further comprising a heat shield to prevent overheating.

3. The apparatus as recited in claim 1, further comprising a housing consisting of a wall portion and a lower base, which surrounds the upper heater, the,steam generator, the upper steam pipe, the lower heater, the lower water pipe, the pump, and the water tank.

4. The apparatus as recited in claim 3, wherein a water inlet and a water indicator are configured on the housing wall portion.

5. The apparatus as recited in claim 1, further comprising a switch to turn on or turn off the apparatus.

6. The apparatus as recited in claim 1, further comprising a security switch to prevent overheating and to stop the steaming function when activated.

7. The apparatus as recited in claim 1, further comprising a micro-controller to control the apparatus.

8. The apparatus as recited in claim 1, wherein a plurality of steam inlets are provided in the steam cooking plate.

9. The apparatus as recited in claim 1, further comprising an upper thermostat to control the temperature of the upper heater and a lower thermostat to control the temperature of the lower heater.

10. An apparatus for steaming food comprising;
    a steam cooking plate defining a steam inlet port and a cooking surface;
    a removable lid for covering the steam cooking plate to form a steaming chamber;
    an upper heater installed under the steam cooking plate for directly heating the steam cooking plate to cook food placed thereon;
    a steam generator having a steam outlet opening and a water inlet opening;
    an upper steam pipe, connected between the steam outlet opening of the steam generator and the steam inlet port of the steam cooking plate;
    a lower heater installed on the steam generator for heating the steam generator;
    a lower water pipe connected between a pump and the water inlet opening of the steam generator;
    a water tank for holding water and supplying the water to the steam generator via the pump; and
    a controller for activating the upper heater and lower heater simultaneously and/or separately.

11. The apparatus as recited in claim 10, further comprising a switch to turn on or turn off the apparatus.

12. The apparatus as recited in claim 10, further comprising a security switch to prevent overheating and to stop the steaming function when the lid is opened for user's safety.

13. The apparatus as recited in claim 10, wherein a plurality of steam inlets are provided on the steam cooking plate.

14. The apparatus as recited in claim 10, further comprising an upper thermostat to control the temperature of the upper heater and a lower thermostat to control the temperature of the lower heater.

* * * * *